US009259976B2

(12) United States Patent
Singh et al.

(10) Patent No.: US 9,259,976 B2
(45) Date of Patent: Feb. 16, 2016

(54) TORSIONAL MODE TIRE WEAR STATE ESTIMATION SYSTEM AND METHOD

(71) Applicant: The Goodyear Tire & Rubber Company, Akron, OH (US)

(72) Inventors: Kanwar Bharat Singh, Stow, OH (US); Yiu Wah Luk, Hudson, OH (US); Anthony William Parsons, Domeldange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 313 days.

(21) Appl. No.: 13/964,307

(22) Filed: Aug. 12, 2013

(65) Prior Publication Data
US 2015/0040656 A1 Feb. 12, 2015

(51) Int. Cl.
*B60C 23/02* (2006.01)
*B60C 23/04* (2006.01)
*B60C 11/24* (2006.01)

(52) U.S. Cl.
CPC .......... *B60C 23/0408* (2013.01); *B60C 11/246* (2013.04)

(58) Field of Classification Search
CPC .... B60C 23/0408; B60C 23/061; G01L 1/00; G01L 7/00; G01M 17/022; G01N 3/56
USPC .......... 73/146.5, 146.4, 146.3, 146.2, 146, 8, 73/7, 700
See application file for complete search history.

(56) References Cited

U.S. PATENT DOCUMENTS

| 6,278,361 | B1* | 8/2001 | Magiawala et al. ........... 340/438 |
| 6,327,904 | B1* | 12/2001 | Oldenettel ...................... 73/146 |
| 6,580,980 | B1* | 6/2003 | Gauthier et al. ............. 701/32.1 |
| 6,604,416 | B2* | 8/2003 | Tsujita ........................ 73/146.5 |
| 6,789,416 | B1* | 9/2004 | Tracy et al. ..................... 73/146 |
| 7,546,764 | B2* | 6/2009 | Morinaga et al. ............... 73/146 |
| 7,552,628 | B2* | 6/2009 | Mancosu et al. ................ 73/146 |
| 2003/0205080 | A1* | 11/2003 | Shteinhauz et al. ........... 73/146 |
| 2008/0103659 | A1* | 5/2008 | Mancosu et al. ................ 701/41 |
| 2009/0000370 | A1* | 1/2009 | Lionetti et al. .................. 73/146 |
| 2009/0055040 | A1* | 2/2009 | Nagaya .......................... 701/29 |
| 2010/0090819 | A1* | 4/2010 | Benedict et al. .............. 340/447 |

(Continued)

FOREIGN PATENT DOCUMENTS

DE 19716586 C1 8/1998
EP 1106397 A2 6/2001

(Continued)

OTHER PUBLICATIONS

European Search Report received Dec. 19, 2014.

*Primary Examiner* — Lisa Caputo
*Assistant Examiner* — Nigel Plumb
(74) *Attorney, Agent, or Firm* — Richard B. O'Planick (57) ABSTRACT

A tire wear state estimation system includes a tire pressure measuring device affixed to a vehicle tire for measuring tire inflation pressure and generating tire inflation pressure data; tire torsional mode measuring means for measuring tire torsional mode frequency and generating tire torsional mode frequency data; and tire identification means for generating tire-specific torsional mode coefficients using tire-specific identification data. A tire wear estimation is made based upon the tire inflation pressure data, the torsional mode frequency data, and the tire identification derived torsional mode coefficients.

18 Claims, 12 Drawing Sheets

(56) References Cited

U.S. PATENT DOCUMENTS

2010/0199756 A1* 8/2010 Hanatsuka ............... 73/146
2011/0199201 A1* 8/2011 Brusarosco et al. .......... 340/438

FOREIGN PATENT DOCUMENTS

EP          2172760 A1    4/2010
WO       2011/054363      5/2011   ......... B60G 17/0165

* cited by examiner

TORSIONAL MODE TIRE WEAR STATE ESTIMATION SYSTEM AND METHOD

FIELD OF THE INVENTION

The invention relates generally to tire monitoring systems for collecting measured tire parameter data during vehicle operation and, more particularly, to a system and method for estimating tire wear state based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire wear state are important considerations for vehicle operation and safety. It is accordingly further desirable to measure tire wear state and communicate wear state to vehicle systems such as braking and stability control systems in conjunction with the measured tire parameters of pressure and temperature.

SUMMARY OF THE INVENTION

According to one aspect of the invention, a tire wear state estimation system includes a tire pressure measuring device affixed to a vehicle tire for measuring tire inflation pressure and generating tire inflation pressure data; tire torsional mode measuring means for measuring tire torsional mode frequency and generating tire torsional mode frequency data; and tire identification means for generating tire-specific torsional mode coefficients using tire-specific identification data. A tire wear estimation is made based upon the tire inflation pressure data, the torsional mode frequency data and the tire-specific torsional mode coefficients.

In another aspect, the tire-mounted pressure measuring device is operative to measure a tire cavity pressure with a pressure sensor and transmit the tire inflation pressure data from the tire cavity pressure measurement. Tire-specific identification data is stored within and accessible from tire-based data storage such as, but not limited to, the tire-mounted pressure measuring device.

Pursuant to another aspect of the invention, the tire-specific torsional mode coefficients are generated from a wheel speed signal or longitudinal acceleration signal obtained from a hub-mounted accelerometer or a tire-based crown-mounted accelerometer.

The tire wear state estimation system, in another aspect, uses a correlation model between the tire wear state and the tire torsional mode frequency wherein the correlation model employs a recursive least squares algorithm based on a polynomial model capturing a dependency between a wear state of the tire, the tire inflation pressure data, and the tire torsional mode frequency.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman Filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is Power Spectral Density (a technical name synonymous with FFT (Fast Fourier Transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
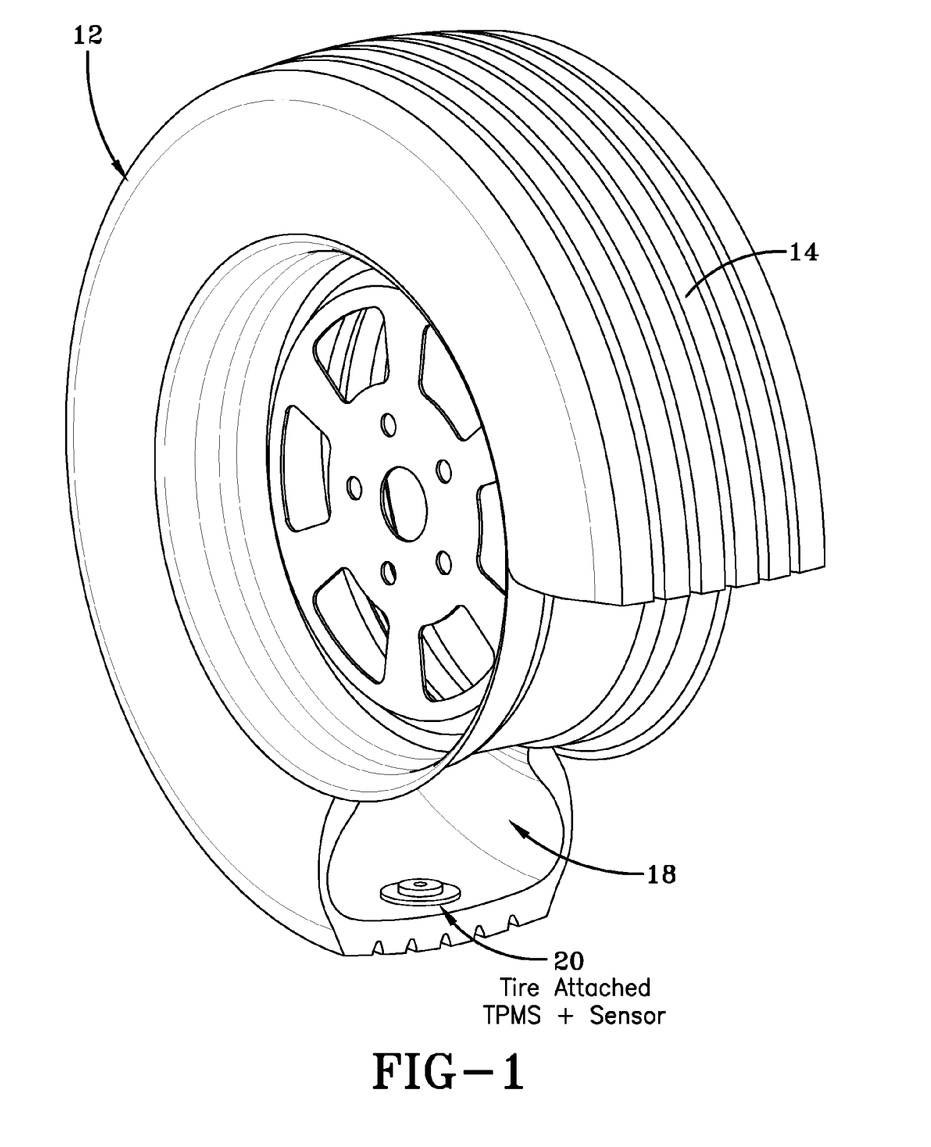
FIG. 1 is a perspective view of a tire having a tire pressure monitoring system incorporated into a tread region.

Referring to FIG. 1, a tire tread wear estimation system 10 is shown based on spectral analysis of the tire tortional vibration signal. Such a system is useful in advising a vehicle owner on when to change tires and may be used to provide a driver with information on the interrelation between the state of tire tread wear and other factors such as road condition. Tire properties generally change as a function of tire wear. Accordingly, an estimate of tire tread wear level may be used as one input for tire state estimation.

Tires (a representative one) 12 mounted to a vehicle 22 include ground-engaging tread regions 14 that wear over time. The tires 12 enclose a tire cavity 18 by means of a tire innerliner 16. A tire pressure monitoring system module (TPMS) 20 may be affixed to the tire innerliner 16. The module 20 stores tire ID information from which tire specific construction data may be identified.

The system 10 employs a tire wear state estimation algorithm uses signals 26 available on a CAN bus (controller area network) 24 of vehicle 22. The signals may include wheel speed signals, useful as an input for an ABS (anti-lock braking system) and/or a wheel hub longitudinal acceleration signal, on vehicles equipped with an active suspension management system. From the wheel speed signal or longitudinal acceleration signal, mode extractions 28 are made, extracting torsional modes. In addition, from the wheel hub acceleration signal, extracting tire vertical modes may be conducted and a tire wear estimation made on the basis of extracted tire vertical modes. Co-pending U.S. patent application Ser. No. 13/917,691, filed Jun. 14, 2013, describes a system of tire wear estimation based on spectral analysis of vertical vibration signals and is incorporated herein by reference. The subject invention utilizes extracted torsional modes and basis the subject tire wear estimation thereon.

FIG. 1 shows the TPMS module 20 in the crown-mounted position in tire 12, opposite the tread region 14. The nomenclature "TPMS+" as used herein means a tire pressure monitoring system having wireless data communication capability built therein. Accordingly, the TPMS module monitors the tire pressure within cavity 18 and transmits pressure data to a remote receiver for processing. The receiver (not shown) may be vehicle-base and/or remotely located.

Figure 6A:
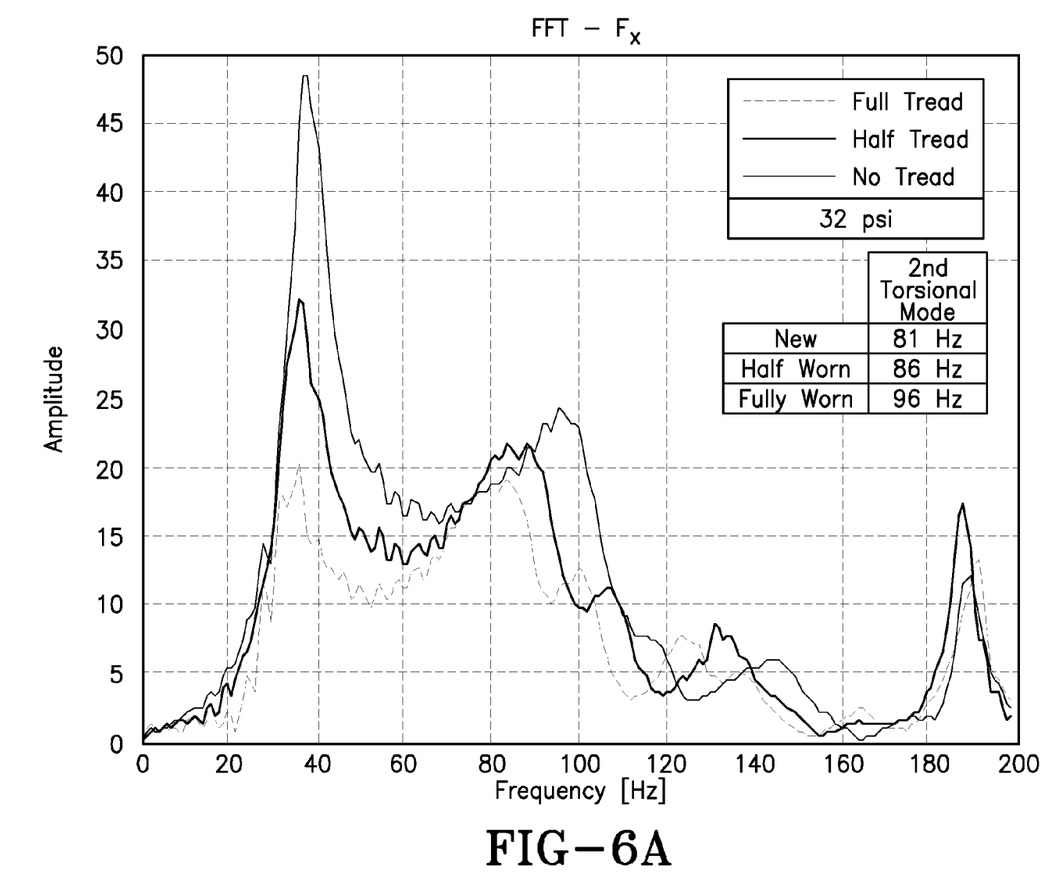
FIGS. 6A, 6B, and 6C are comparisons graph of torsional mode frequency vs. amplitude for full, half and no tread conditions at 32, 36 and 40 psi., respectively, and showing sensitivity of the torsional mode in tabular form for the three tire conditions at the three inflation pressures.
Figure 6B:
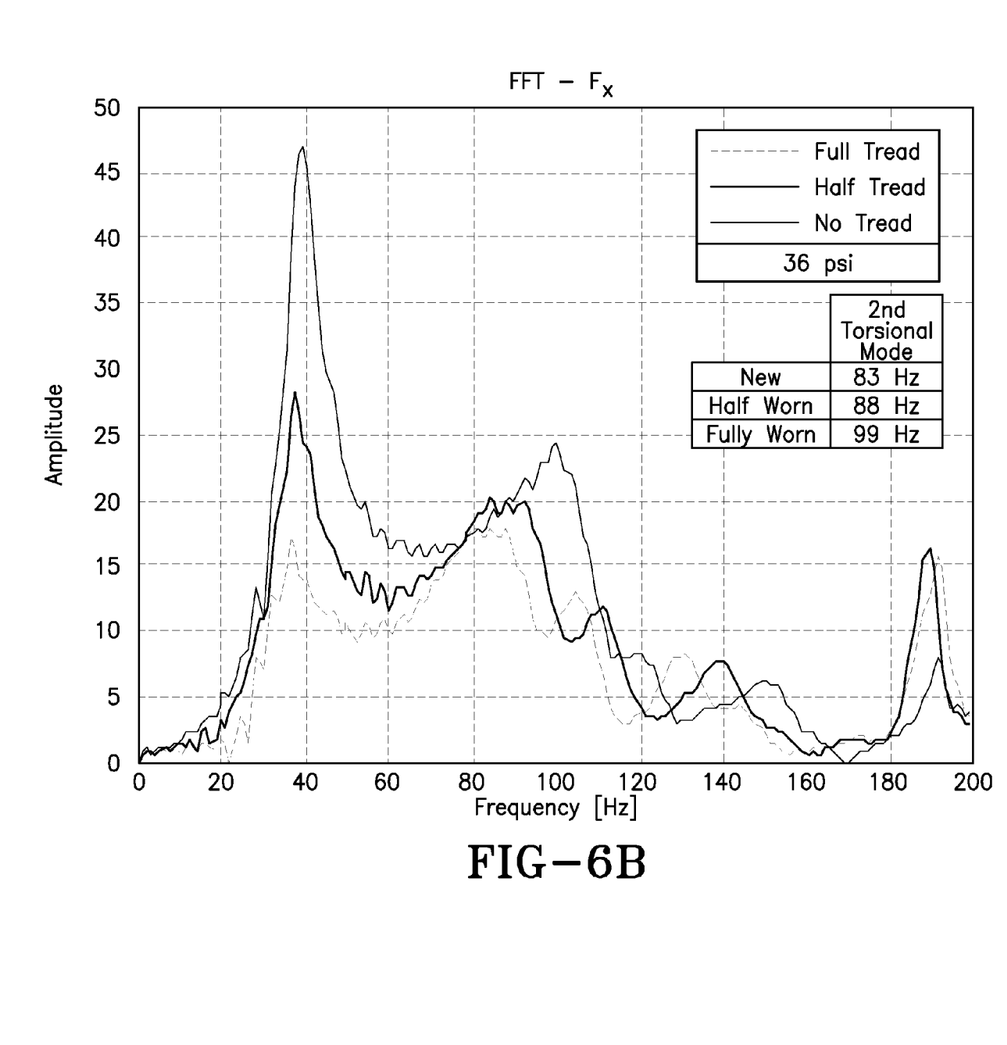
Figure 6C:
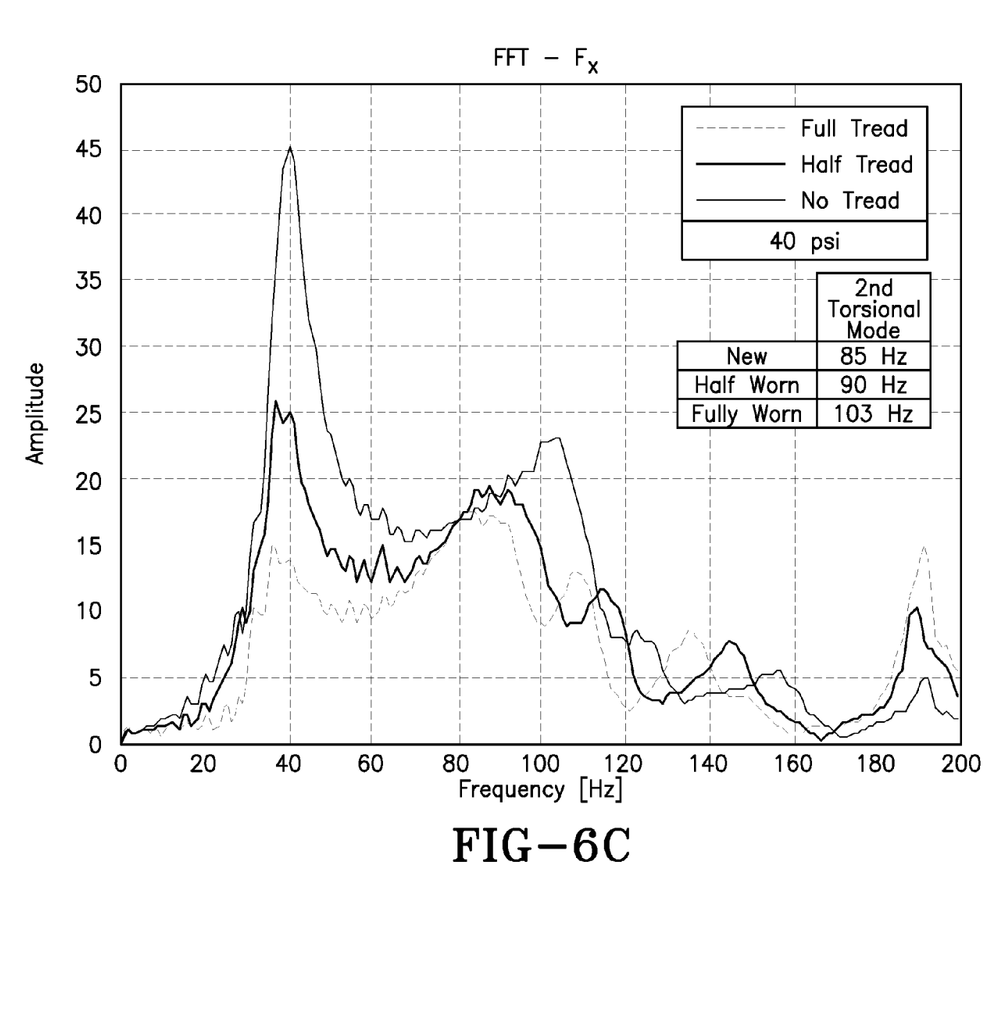
Figure 7:
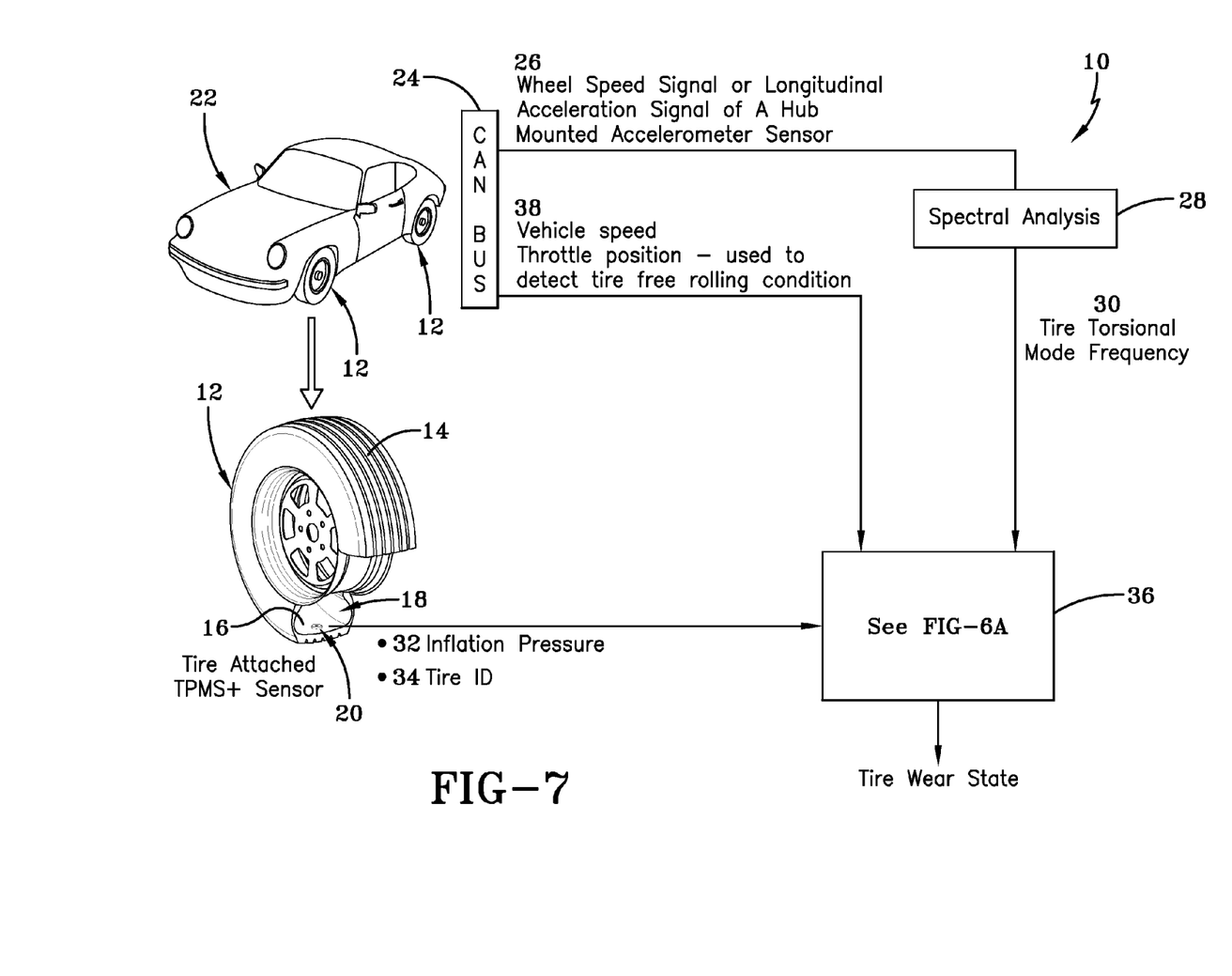
FIG. 7 is a block level diagram of the tire wear estimation system using vehicle wheel speed signal or longitudinal acceleration signals and tire inflation pressure and tire identification to obtain tire torsional mode frequency and an estimation of tire wear state based thereon.

With continued reference to FIG. 7, an evaluation 30 is then conducted of the tire torsional mode frequency extraction to correlate the influence of the tire wear state (depth level of the tire tread 14) with the tire tortional mode by using spectral analysis methods 28. Application of a correlation model 36 (see FIGS. 6A through 6C) is made is which the tire wear state estimation is based on the tire tortional mode frequency for a given measured tire inflation pressure. Tire specific models are developed by tire model identification number and tire pressure values are generated and stored for consultation. Once TPMS-facilitated tire identification information is obtained from the tire, the correct correlation model is applied, using the extracted second mode torsional frequency and the TPMS-measured tire pressure. Consultation with the appropriate tire-specific correlation model will yield an accurate estimation of tire wear level. From FIG. 7, it will further be seen that the correlation model further incorporates data 38 indicative of throttle position to detect a tire free rolling condition.

Figure 2:
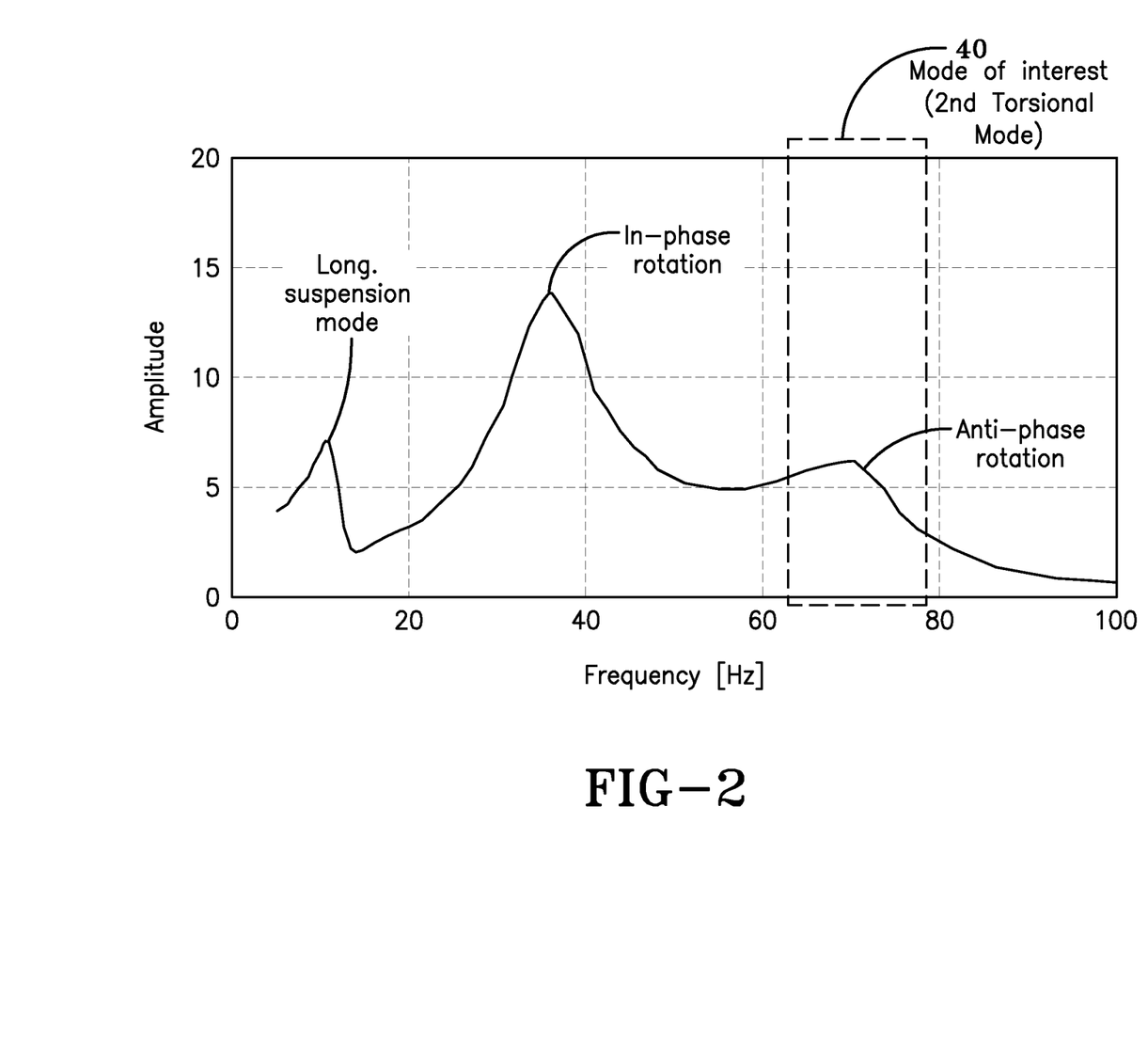
FIG. 2 is a frequency graph showing an amplitude vs. frequency of the tire and indicating the graph region of interest for extracting torsional mode components.

The basis for using a correlation between torsional mode frequency and tire wear state will now be explained. With reference to FIG. 2, the tire amplitude vs. frequency [Hz] graph is shown with long suspension, in-phase rotation, and anti-phase rotation peaks identified. The region 40 of the graph, represented in phantom, represents the mode of interest in making the subject load estimation; namely the $2^{nd}$ torsional mode. It is this mode of a vibrating tire that is useful tire wear state (tread 14 depth level) that may be analyzed through the use of spectral analysis methods in the development of a correlation model between the tire wear state and the tire torsional modes.

The torsional (rotational) vibration modes are summarized below. "Belt" as used herein refers to the structural belt reinforcement of the tire.

First torsional mode: In the in-phase mode at 30 to 40 Hz, the rim has a rotational vibration and the belt rotation has a vibration in the same phase.

Second torsional mode: The rotational velocity of the rim and the belt are in an opposite phase in the anti-phase mode (around 80 Hz).

For the purpose of experimental testing relied upon herein, a Goodyear Eagle F1 Asymmetric tire, Size 255/45ZR19, was used. The tread depth of the tire is categorized as "New", representing a tire weight of 12 kg; "Half-worn" representing a tire weight of 11 Kg; or "Completely worn", representing a tire weight of 9.9 Kg. There is approximately a 10 percent loss in a tire weight for every 2.5 mm decrease in the tread depth.

The testing was conducted on a tire using a cleated wheel on a fixed spindle machine. The fixed spindle machine, of common use in the industry, represents good control over the tire load and rolling speed. Inflation pressure was manually changed prior to each test, and the wear dependencies were captured by using tires with different levels of non-skid depth. Cleat inputs are known to introduce torsional and vertical excitations in the tire and the subject test apparatus accordingly produced tire excitations of interest in the evaluation of the subject wear estimation methodology.

Figure 3A:
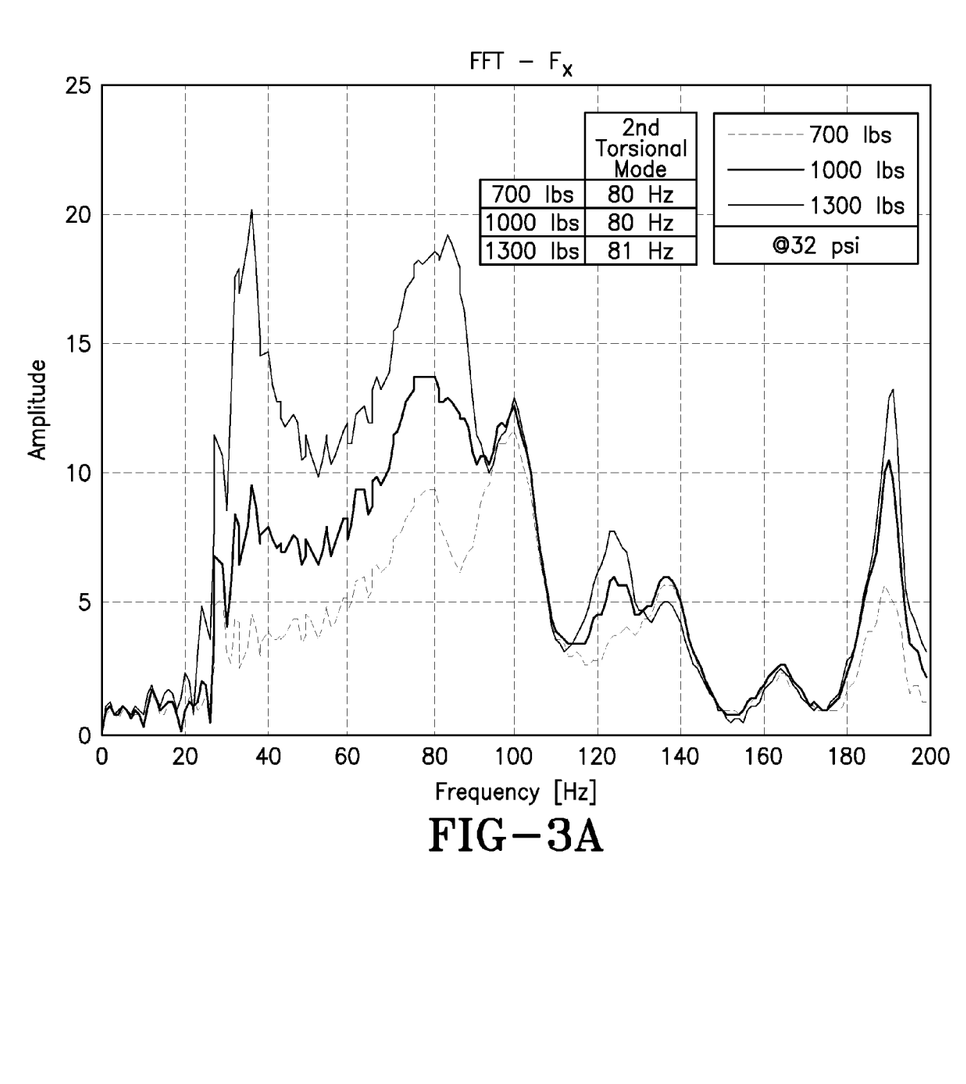
FIG. 3A is a frequency vs. amplitude graph for the tire at three loading levels at 32 psi, and showing the second torsional mode frequency at the different loadings.
Figure 3B:
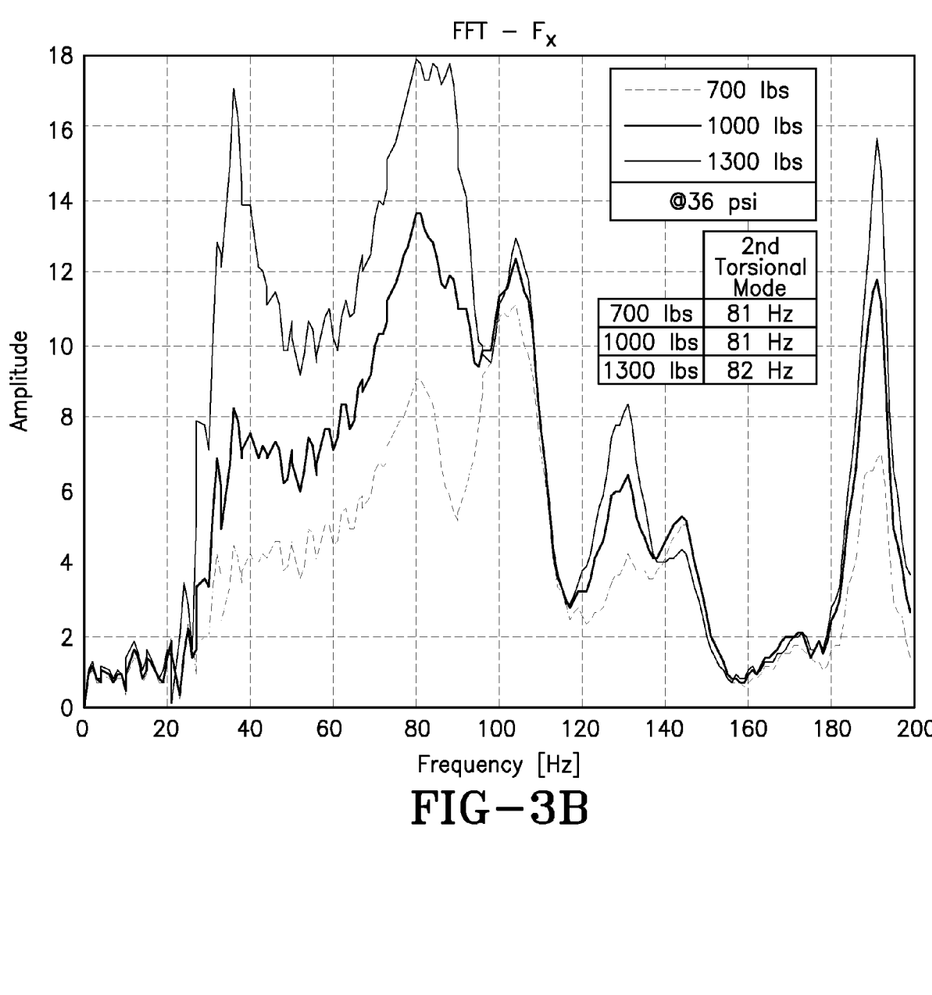
FIG. 3B is a frequency vs. amplitude graph showing the torsional mode at the three tire loadings at 36 psi.
Figure 3C:
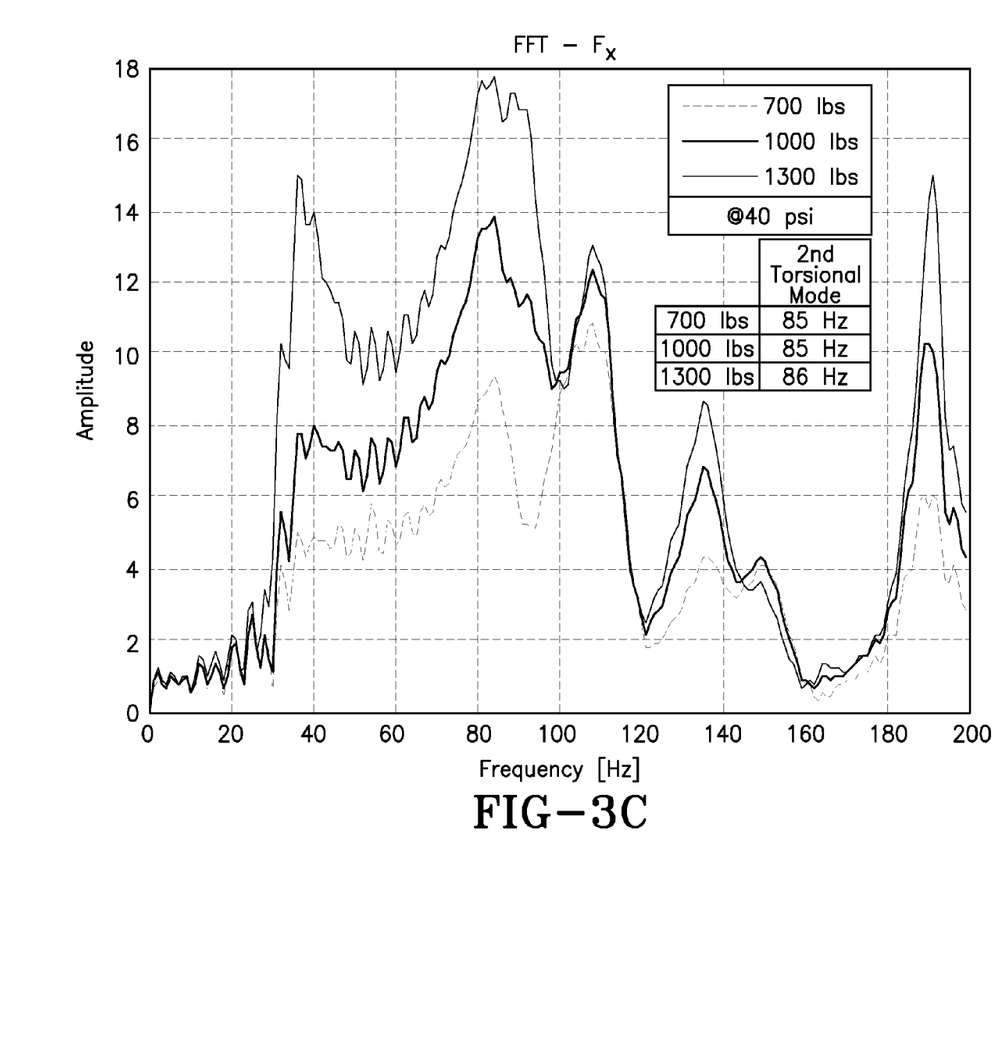
FIG. 3C is a frequency vs. amplitude graph showing torsional mode at the three tire loadings and at a tire inflation of 40 psi.

In FIG. 3A, cleats of 3 mm and 5 mm were used and the torsional mode FFT-Fx determined for loads of 700, 1000 and 1300 pounds at 32 psi. inflation. In FIG. 3B, for the same two cleat sizes, the graphs for the same tire loadings at an inflation of 36 psi is shown. In the graphs of FIG. 3C, an inflation of 40 psi is used. The graph results of FIGS. 3A through 3C indicate that a change in the tire loading condition influences the signal amplitude but changes in the signal spectral content (mode frequency) were relatively low.

Figure 4A:
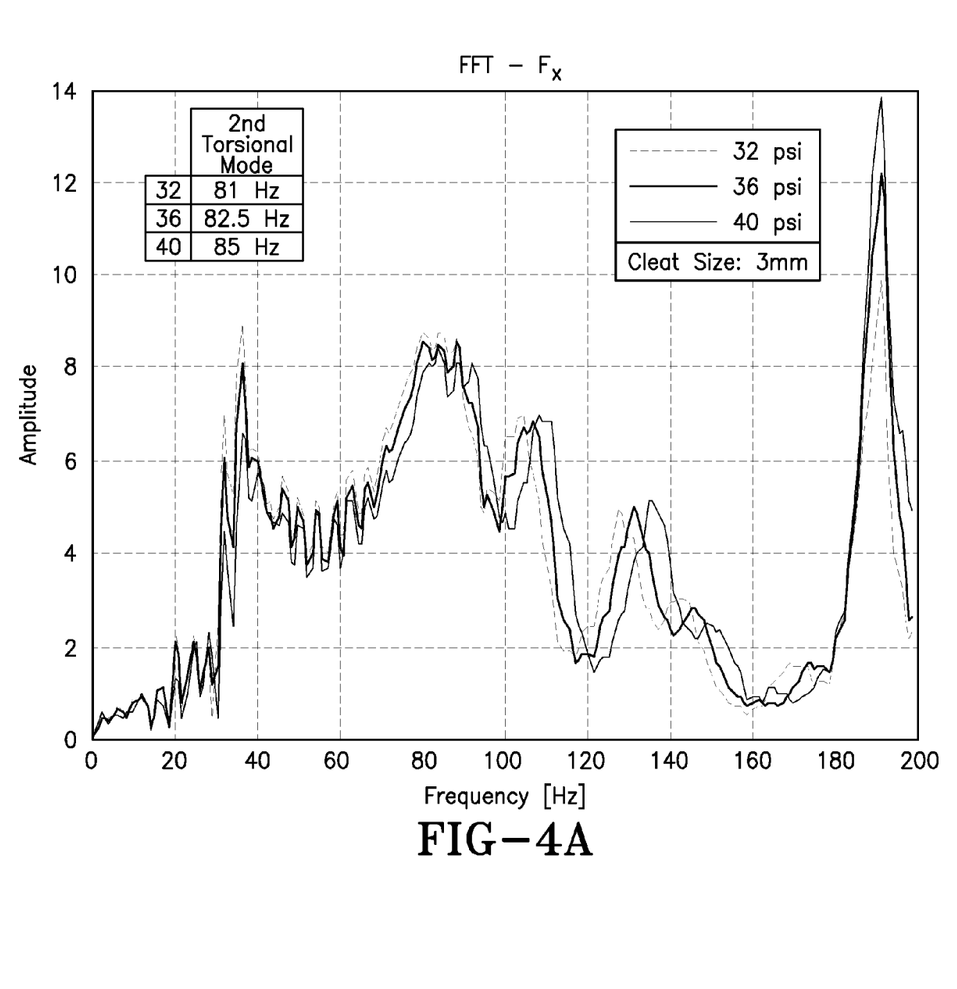
FIG. 4A is a summary frequency vs. amplitude graph for a tire cleat of 3 mm size at the three different tire inflation pressure levels.
Figure 4B:
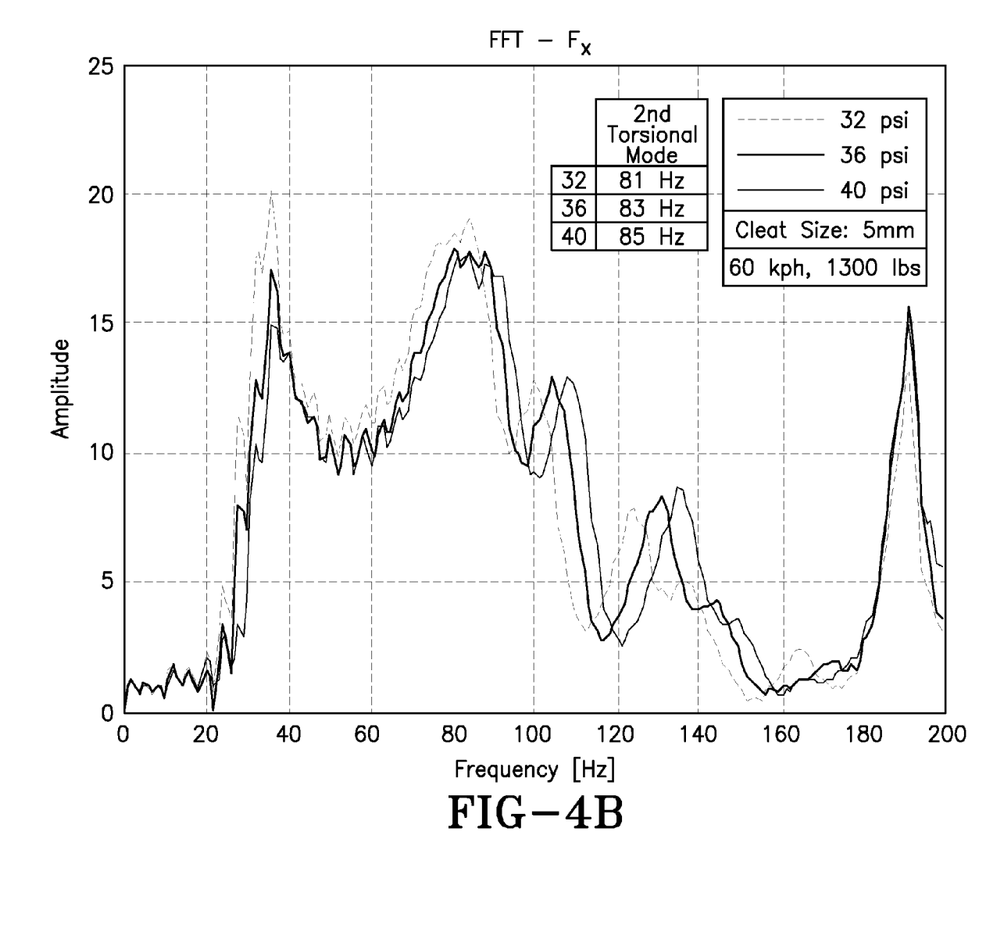
FIG. 4B is a summary frequency vs. amplitude graph for a tire cleat of 5 mm size at three different pressure levels with the tire set at 60 kph and a tire loading of 1300 pounds.

Cleat size of 3 mm and 5 mm are compared in the graphs of FIGS. 4A and 4B. The tire inflation dependencies were also tested as reflected in test results of FIGS. 4A and 4B. FIG. 4A shows the test results for a tire on a cleated wheel with cleat size of 3 mm for inflation pressures of 32, 36 and 40 psi. The second torsional mode at the tested inflation pressure were found to be, respectively, 81, 82.5 and 85 Hz. The results indicate that changes in signal amplitude and its spectral content are moderately high as a result of tire inflation variance. FIG. 4B shows test results of the tire under a range of loads on a wheel having cleats of 5 mm. The second torsional mode at the tested inflation pressure were found to be, respectfully, 81, 83 and 85 Hz. The results indicate that changes in signal amplitude and its spectral content are moderately high as a result of tire inflation variance.

Figure 5:
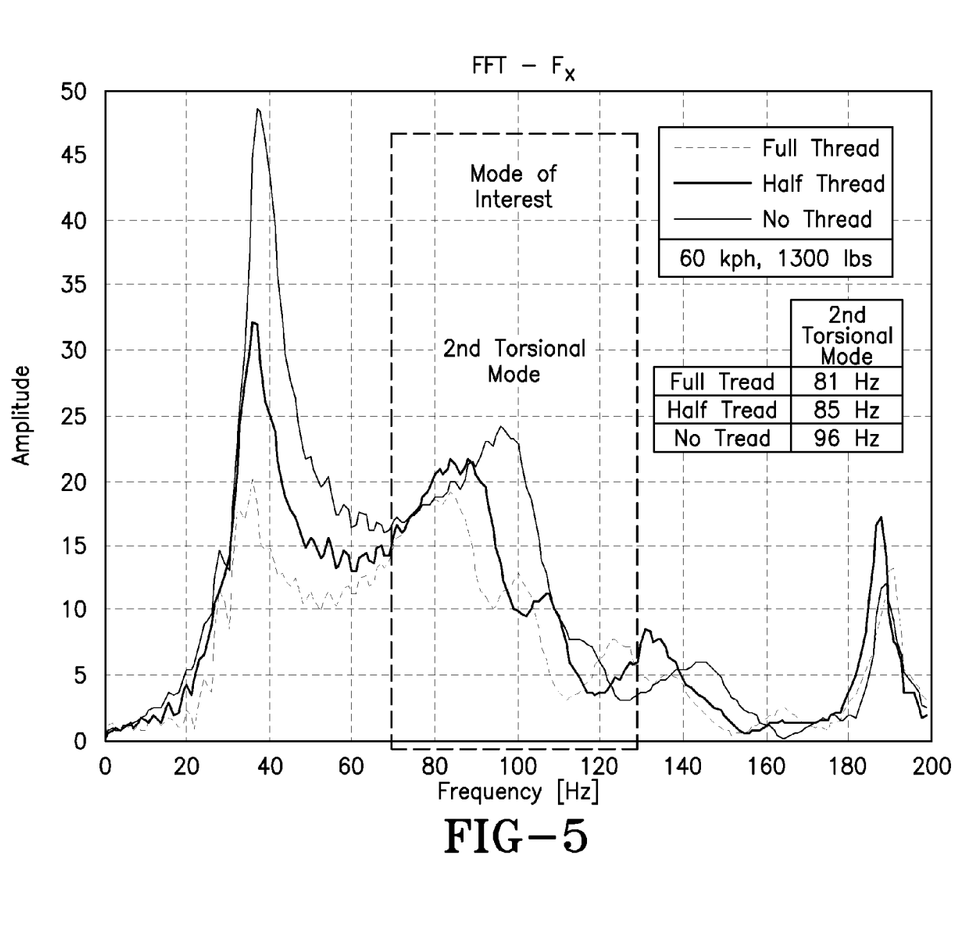
FIG. 5 is a set of graphs showing frequency vs. amplitude and the second torsional mode region, for a tire at full, half and no thread condition, and a loading of 1300 pounds, comparing the experimental results for the torsional mode frequency attained at the three tire tread condition levels.

FIG. 5 summarizes graphically and by table the second torsional mode variation at a speed of 60 kph, load of 1300 pounds, for the three tread wear condition levels. An identification of the portion of the graph of interest in the spectral analysis of the torsional mode is given. The table indicates the second torsional mode for the three tread conditions.

In FIGS. 6A through 6C, the pressure dependency of the torsional mode frequency FFT-Fx is graphically shown for a tire at full tread, half tread and no tread. As seen by the differing torsional mode computations in the table, tire wear state dependencies create the highest torsional mode divergences. The relatively high tire wear state dependencies provide the verification and basis for the development of a tire wear state estimation algorithm based on torsional mode analysis pursuant to the invention. Moreover, the graphs indicate the relationship that tire inflation pressure has in the analysis, and provides the basis for using measured tire pressure data as an input into the tire wear state model.

From the above, it will be seen that influencing factors of inflation pressure, tread depth, vertical load, and speed (rotational velocity) are dependent. The inflation pressure affects vertical and torsional stiffness of the tire; the tread depth affects tread mass; vertical load affects impact force on the tire; and speed affects impact force and stiffness (centrifugal stiffening effect). The level of each influencing factor manifest in amplitude and frequency. For inflation variation, amplitude and frequency variations are relatively moderate. Tread depth influences amplitude and frequency highly. The effect of vertical load variation is high on amplitude but low on frequency while speed affects amplitude highly but frequency only moderately.

The multiple dependencies make an "amplitude" based approach problematic. The dependency of the tire second torsional mode frequency to tire wear state and inflation pressure, however, makes the "frequency" based approach of the subject methodology effective.

From FIG. 7, it will be seen that information about the tire torsional frequency can be obtained using one of the following methods:

Approach 1: From the wheel speed signal.
Approach 2: From measurement of longitudinal acceleration signal of a hub-mounted accelerometer sensor.

It is experimentally verified that the goodness of fit of the tread wear estimation model is acceptable. The model fit was compared against experimental data and with the fit yielding a correlation coefficient (r)=0.988. Validation of the model is thus indicated. A polynomial model (second-order in pressure and first-order in tread depth) were found to give a good fit.

From the tire-based flow chart model implementation shown in FIG. 7, the tire wear state is derived capturing the dependencies between the tire wear state, inflation pressure and the tire torsional mode frequency. Inflation pressure of the tire 12 and tire ID information 34 is obtained from the TPMS module 20 mounted to the tire. The Model Coefficients are tire-construction specific and are ascertained by the tire identification obtained from TPMS stored data. For a given tire construction, a recursive least squares (RLS) estimate of the tire wear state can be made using the tire inflation pressure, tire ID (to use the correct model coefficients) and the tire torsional mode frequency information. The sensors and data stored within TPMS module 20 is used to obtain pressure and tire ID information. The measurement of tire torsional mode on the vehicle is derived from either approach identified above and indicated in FIG. 7 at 26. A wheel-mounted accelerometer or a tire crown-mounted accelerometer may be used for providing the signal.

The RLS Estimation Algorithm (with forgetting factor) provides a method to iteratively update the unknown parameter at each sampling time to minimize the sum of the squares of the modeling error using the past data contained within the regression vector. The following is the model capturing the dependency between the tire wear state, inflation pressure and the tire torsional mode frequency:

Fitting Model $$\text{Tire Torsional Mode Frequency} = p00 + p10*\text{pressure} + p01*\text{tread depth} + p20*\text{pressure}^2 + p11*\text{pressure}*\text{tread depth}$$

Model Coefficients (with 95 percent confidence bounds):
  $p00$=−35.94 (−171.6, 99.72)

p10=6.586 (−0.9712, 14.14)
p01=−2.31 (−5.37, 0.7512)
p20=−0.08333 (−0.1881, 0.02144)
p11=0.01786 (−0.06682, 0.1025)

The above equation can be rewritten into a standard parameter identification form as follows:

$$y = \psi^T \theta$$

Where: $y$ = (Tire Torsional Mode Frequency − $p00$ −

$p10 * \text{pressure} - p20 * \text{pressure}^{\wedge}2)/(p11 * \text{pressure} + p01)$ $\psi = 1$ $\theta$ = Tread depth (unknown-to be estimated)

The procedure for solving the RLS problem is as follows:

Step 0: Initialize the unknown parameter θ(0) and the covariance matrix P(0); set the forgetting factor λ.

Step 1: Measure the system output y(t) and compute the regression vector φ(t).

Step 2: Calculate the identification error e(t):

$$e(t) = y(t) - \phi^T(t) \cdot \theta(t-1)$$

Step 3: Calculate the gain k(t):

$$k(t) = P(t-1)\phi(t)[\lambda + \phi^T(t)P(t-1)\phi(t)]^{-1}$$

Step 4: Calculate the covariance matrix:

$$P(t) = (1 - k(t)\phi^T(t)\lambda^{-1}P(t-1)$$

Step 5: Update the unknown parameter:

$$\theta(t) = \theta(t-1) + k(t)e(t)$$

Step 6: Repeat Steps 1 through 5 for each time step.

Where y is the output; ψ is the regression vector; and θ is the unknown parameter. The inputs of regression vector and output are used respectively as input and output in the recursive least squares (with forgetting factor) parameter estimation algorithm to solve for the unknown parameter of the tire tread depth.

The subject method for tire wear estimation may utilize either an on-vehicle measurement of the tire torsional mode or an in-tire measurement of the tire torsional mode, or both for the purpose of cross-validation. For on-vehicle measurement, the torsional mode is extracted from either the wheel speed signal or longitudinal acceleration signal 26 from a hub-mounted accelerometer. Hub-mounted accelerometers are commercially available and are used as part of vehicle suspension management systems. From tests conducted on various surfaces, it was found that the tire torsional mode was successfully detected under all road conditions. The test results all verified extracting torsional mode from either approach for the purpose of tread wear estimation pursuant to the subject methodology.

An on-vehicle algorithm implementation of the subject system may be used for in-tire measurement of the tire torsional mode. The vehicle 22 provides by CAN bus 24 the vehicle speed, load and throttle position as input into the tire wear state estimation model. From the tire 12, the TPMS (including an accelerometer) module 20 provides inflation pressure, tire ID data and a acceleration signal from a crown mounted accelerometer. From a spectral analysis of the radial acceleration signal, as explained above, the tire torsional mode frequency is obtained and input to the tire wear state estimation model (FIG. 6A). An estimated tire wear state can thus be obtained.

From the foregoing, it will be appreciated the subject tread wear estimation system utilizes a novel algorithm to estimate the tire wear state. Tire wear state is recursively estimated by using a RLS algorithm formulated based on a polynomial model which captures the dependencies between the tire wear state, inflation pressure and the tire torsional mode frequency. The model inputs for the RLS algorithm include: tire inflation pressure, tire ID (required for using the correct tire specific model coefficients) and the tire torsional mode frequency. The tire inflation pressure and tire ID information is available from a tire attached TPMS module. Information about the tire torsional mode frequency can be obtained by using one of the approaches identified herein.

Both approaches may be employed for cross-validation of results. The application of the real-time RLS algorithm in achieving the desired tread wear estimation and accurate estimation results were experimentally validated.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
   at least one tire supporting a vehicle;
   tire pressure measuring means affixed to the one tire for measuring tire inflation pressure and generating tire inflation pressure data;
   tire torsional mode measuring means for measuring tire torsional mode frequency and generating tire torsional mode frequency data;
   tire identification means mounted to the one tire operably utilized in generating tire-specific frequency mode coefficients using tire-specific identification data; and
   tire wear estimation means for calculating an estimation of a tire wear state based upon the tire inflation pressure data and a spectral analysis of the torsional mode frequency data employing the tire-specific frequency mode coefficients.

2. The tire wear state estimation system of claim 1, wherein the tire pressure measuring means comprises a tire-mounted pressure measuring device operative to measure by a pressure sensor a tire cavity pressure and transmit the tire inflation pressure data from the tire cavity pressure measurement.

3. The tire wear state estimation system of claim 2, wherein the tire-specific identification data is stored within and accessible from the tire-mounted pressure measuring device.

4. The tire wear state estimation system of claim 3, wherein the tire-specific torsional frequency mode coefficients are generated using a wheel speed signal or a hub mounted accelerometer sensor signal.

5. The tire wear state estimation system of claim 4, wherein the measurement of the tire torsional mode frequency is from a wheel-mounted accelerometer or a tire crown-mounted accelerometer.

6. The tire wear state estimation system of claim 4, wherein the tire wear estimation means comprises a correlation model between the tire wear state and the tire torsional mode frequency.

7. The tire wear state estimation system of claim 6, wherein the correlation model comprises a recursive least squares algorithm based on a polynomial model capturing a dependency between a wear state of the tire, the tire inflation pressure data and the tire torsional mode frequency.

8. The tire wear state estimation system of claim 1, wherein the tire wear estimation means comprises a correlation model between the tire wear state and the tire torsional mode frequency.

9. The tire wear state estimation system of claim 8, wherein the correlation model comprises a recursive least squares algorithm based on a polynomial model capturing a dependency between the tire wear state, the tire inflation pressure data, and the tire torsional mode frequency.

10. A tire wear state estimation system comprising:
at least one tire for supporting a vehicle;
a tire-mounted pressure measuring device affixed to the one tire operative to measure a tire cavity pressure and transmit tire inflation pressure data from the tire cavity pressure measurement;
tire-specific identification data stored within and accessible from a tire-mounted data storage device;
tire torsional mode measuring means for measuring tire torsional mode frequency and generating tire torsional mode frequency data;
tire identification means mounted to the one tire operably utilized in generating tire-specific torsional mode frequency coefficients using the tire-specific identification data and wheel speed signal or longitudinal acceleration signal measurement of a tire torsional mode frequency; and
tire wear estimation means for calculating an estimation of a tire wear state based upon the tire inflation pressure data and a spectral analysis of the tire torsional mode frequency data utilizing the tire-specific torsional mode coefficients.

11. The tire wear state estimation system of claim 10, wherein the measurement of the tire torsional mode frequency is from a wheel-mounted accelerometer or a tire crown-mounted accelerometer.

12. The tire wear state estimation system of claim 10, wherein the tire wear estimation means comprises a correlation model between the tire wear state and the tire torsional mode frequency.

13. The tire wear state estimation system of claim 12, wherein the correlation model comprises a recursive least squares algorithm based on a polynomial model capturing a dependency between a wear state of the tire, the tire inflation pressure data and the tire torsional mode frequency.

14. A method of tire wear state estimation comprising:
affixing a tire pressure measuring device to a vehicle-supporting tire, the pressure measuring device having at least one pressure sensor measuring a tire cavity inflation pressure and generating tire inflation pressure data;
measuring tire torsional mode frequency and generating tire torsional mode frequency data;
affixing a tire-specific identification device to the vehicle-supporting tire operable to provide tire-specific identification data:
generating tire-specific torsional mode coefficients based on the tire-specific identification data; and
calculating an estimation of a tire wear state based upon the tire inflation pressure data and a spectral analysis of the measured torsional mode frequency data utilizing the tire-specific frequency mode coefficients based on the tire-specific identification data.

15. The method of claim 14, wherein further comprising generating the tire-specific torsional mode coefficients using a wheel speed signal or a longitudinal acceleration signal measurement of a tire torsional mode frequency.

16. The method of claim 15, wherein further comprising measuring the tire torsional mode frequency from a wheel-mounted accelerometer or a tire crown-mounted accelerometer.

17. The method of claim 14 wherein calculating an estimation of the tire wear state comprises employing a correlation model between the tire wear state and the tire torsional mode frequency.

18. The method of claim 17, wherein further comprising configuring the correlation model to comprise a recursive least squares algorithm based on a polynomial model capturing a dependency between the tire wear state, the tire inflation pressure data and the tire torsional mode frequency.

* * * * *